July 9, 1968     D. J. WALDMAN     3,391,859

TURBOCHARGER COMPRESSOR WITH VARIABLE AREA DIFFUSER

Filed Feb. 23, 1966

INVENTOR.
DONALD J. WALDMAN
BY
Fryer, Tjensvold, Feix & Phillips
ATTORNEYS

United States Patent Office 3,391,859
Patented July 9, 1968

3,391,859
TURBOCHARGER COMPRESSOR WITH
VARIABLE AREA DIFFUSER
Donald J. Waldman, Peoria, Ill., assignor to Caterpillar
Tractor Co., Peoria, Ill., a corporation of California
Filed Feb. 23, 1966, Ser. No. 529,477
5 Claims. (Cl. 230—114)

ABSTRACT OF THE DISCLOSURE

A turbocharger having a compressor and a diffuser and means for automatically varying the turbocharger output or cross-sectional area of the compressor diffuser to correspond with engine demands.

As set forth in my assignee's earlier patent to Dressen and Evans No. 3,150,650 for "Variable Area Diffuser for Compressor," turbochargers used for supplying air to the combustion chambers of an engine often have an undesirable performance characteristic known as "surging" which occurs at low engine speed. Surging which is a rapid fluctuation of the static pressure in the compressor is caused by a low rate of air consumption accompanying low engine speeds. When the pressure in the compressor increases due to the engine not consuming all of the air that is furnished by the compressor, pressure in the compressor housing exceeds the total air pressure in the diffuser and a reversal in the direction of flow occurs. This results in a pressure drop in the compressor housing which is quickly built back up by normal compressor action until the pressure buildup is sufficient to reverse the air flow. This sequence of events causes air to be delivered to the engine in surges which results in irregular and inefficient engine operation.

It is an object of the present invention to provide a turbocharger in which the above referred to surging does not occur and to provide a very simple and inexpensive means for automatically regulating the cross-sectional area of the diffuser passage.

It is also an object to improve the efficiency and versatility of turbochargers by providing means for automatically varying the cross section of the diffuser passage in response to velocity of gas flowing through the passage.

Further and more specific objects and advantages of the invention are made apparent in the following specification wherein reference is made to the accompanying drawing.

Figure 1:
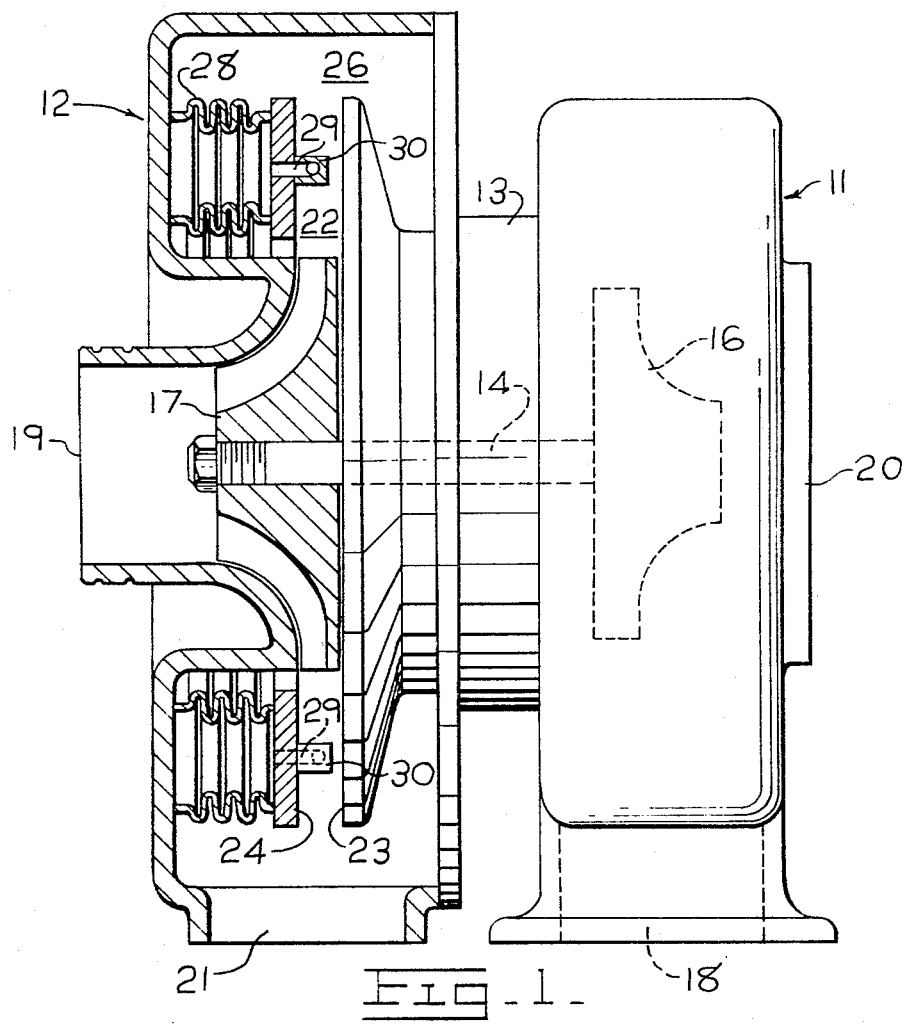
FIG. 1 is a schematic view partially in section of a turbocharger which embodies the present invention.

The turbocharger shown in FIG. 1 of the drawing comprises a turbine unit, generally indicated at 11, and a compressor unit, generally indicated at 12, connected as by an integral bearing housing 13 in which shaft 14 is rotatably supported in bearings (not shown). The shaft 14 serves as a common support for a turbine wheel shown in dotted lines at 16 and a compressor wheel 17.

The turbocharger functions in a conventional manner, the turbine wheel 16 being rotated by the exhaust gas of an internal combustion engine (not shown) which enters through an inlet 18 impinging on the blades of the turbine wheel and imparting high speed rotation thereto. The exhaust gases then flow outwardly through an exhaust fitting indicated at 20. The rotation of the turbine wheel 16 is imparted through the shaft 14 to the compressor wheel 17, the function of which is to draw atmospheric air through an inlet 19 and dispel it radially outwardly through a discharge opening at 21 from which it is directed by a conduit (not shown) to the intake manifold of the internal combustion engine.

A diffuser passage 22 is formed by a fixed diffuser wall 23 on one side which is an integral part of the compressor housing and an adjustable diffuser wall 24 on the opposite side, both walls being annular in configuration and discharging into the annular portion of the housing which forms a chamber 26 before being directed outwardly through the discharge passage 21. It is in the chamber 26 that pressure builds up under certain operating conditions and causes the back flow and surging referred to hereinabove.

An engine operating at normal speed will utilize sufficient quantities of air for combustion to prevent excessive pressure buildup in the chamber 26. When, however, the speed of engine is reduced as when working under a heavy load but the speed at which the compressor wheel 17 is operated is not proportionately reduced, more air will be delivered to chamber 26 through diffuser area 22 than is usable by the engine. The result is an excess of pressure buildup in chamber 26 until such time as the pressure causes a reversal of flow and a temporary pressure drop in chamber 26 which results in surging.

To overcome this automatically, the movable wall 24 of the diffuser area is mounted on a resilient bellows 28 which forms an annular chamber behind the wall. This chamber is sealed except for passages 29 extending through the wall and through air foils 30, any suitable number of which may be arranged on the wall to form taps from which air may be withdrawn from the interior of the bellows 28.

Figure 2:
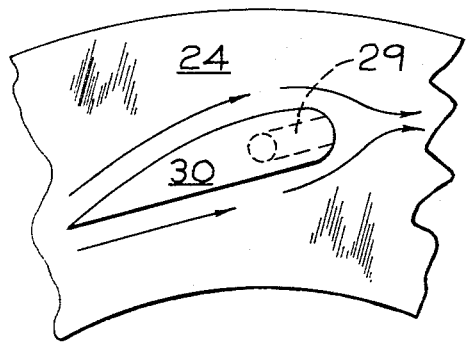
FIG. 2 is an enlarged fragmentary view of a part of an adjustable diffuser wall showing a device thereon which forms a part of the invention.
Figure 3:
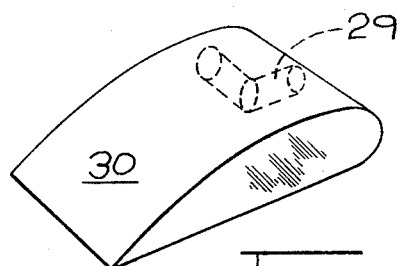
FIG. 3 is a perspective view of the device shown in FIG. 2 which is supported on the diffuser wall.

To accomplish the purpose of the present invention, the cross sectional area of the diffuser space between the walls 23 and 24 should be increased for high engine speed and high velocity of air passing therethrough and decreased when the velocity decreases. This is accomplished automatically because air passing the air foils 30 in the direction indicated by arrows in FIG. 2 produces a low pressure area on the downstream side of the air foil to cause withdrawal of air through the passages 29. This causes partial collapsing of the bellows 28 and receding of the wall 24 to enlarge the diffuser area. The bellows 28 are formed of material having resilient qualities tending to retain the wall 24 in its extended or low speed position shown so, when engine speed is reduced and the velocity of air passing through the diffuser is reduced, the pressure on the downstream side of the foils 30 increases permitting air to enter the bellows as their resiliency tends to return the wall 24 to its low speed position.

I claim:

1. In a rotary air compressor having a rotor and an annular diffuser area surrounding the rotor, spaced annular substantially parallel walls defining the diffuser area, means supporting at least one of the walls for movement to and away from the other, and means mounted in said diffuser area and responsive to velocity of air from the compressor passing through the diffuser to adjust the movable wall and vary the cross sectional area of the diffuser.

2. The combination of claim 1 in which the movable wall is supported on bellows, and means for increasing and decreasing the volume of air in the bellows.

3. The combination of claim 2 in which the means for increasing and decreasing the volume of air comprises air foil means in the path of air in the diffuser and passages communicating between the downstream portions of the air foil means and the interior of the bellows.

4. The combination of claim 2 in which the bellows comprises two spaced annular walls supporting a diffuser wall and providing an annular air space.

5. The combination of claim 4 in which air foil means are disposed on the diffuser wall and have passages between their downstream areas and the interior of the bellows whereby high velocity air in the diffuser will draw air from the bellows.

References Cited

UNITED STATES PATENTS

| | | | |
|---|---|---|---|
| 2,803,396 | 8/1957 | Darrow | 230—114 |
| 3,032,259 | 5/1962 | Jassniker | 230—114 |
| 2,323,941 | 7/1943 | Smith | 230—114 |
| 2,933,237 | 4/1960 | Darrow et al. | 230—114 |
| 3,150,650 | 9/1964 | Dreesen et al. | 230—114 |

WILLIAM L. FREEH, *Primary Examiner.*

LAURENCE V. EFNER, *Examiner.*